United States Patent
Brookler et al.

(10) Patent No.: US 7,930,323 B2
(45) Date of Patent: Apr. 19, 2011

(54) METHOD FOR REALLOCATING TABLE FORMATS IN REAL-TIME

(75) Inventors: David Brookler, Los Angeles, CA (US); Paul Weinberg, Los Angeles, CA (US)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 11/027,577

(22) Filed: Dec. 30, 2004

(65) Prior Publication Data
US 2006/0150078 A1 Jul. 6, 2006

(51) Int. Cl.
*G06F 7/00* (2006.01)
*G06F 17/30* (2006.01)

(52) U.S. Cl. .................. 707/805; 707/804; 709/788

(58) Field of Classification Search .......... 715/764, 715/509, 711, 792, 788, 705, 220, 209, 762, 715/212; 707/100, 102, 517, 804, 805; 386/69, 386/94
See application file for complete search history.

(56) References Cited

U.S. PATENT DOCUMENTS

| | | | | |
|---|---|---|---|---|
| 5,420,695 A * | 5/1995 | Ohta | .......... | 358/462 |
| 5,572,644 A * | 11/1996 | Liaw et al. | .......... | 715/209 |
| 5,982,365 A * | 11/1999 | Garcia et al. | .......... | 715/705 |
| 6,006,240 A * | 12/1999 | Handley | .......... | 715/220 |
| 6,246,442 B1 * | 6/2001 | Harada et al. | .......... | 348/569 |
| 6,330,007 B1 * | 12/2001 | Isreal et al. | .......... | 715/762 |
| 6,377,285 B1 * | 4/2002 | Doan et al. | .......... | 715/764 |
| 6,642,945 B1 * | 11/2003 | Sharpe | .......... | 715/788 |
| 7,117,504 B2 * | 10/2006 | Smith et al. | .......... | 719/328 |
| 7,246,326 B2 * | 7/2007 | Haley | .......... | 715/762 |
| 2001/0011364 A1 * | 8/2001 | Stoub | .......... | 717/1 |
| 2002/0116417 A1 * | 8/2002 | Weinberg et al. | .......... | 707/517 |
| 2003/0142960 A1 * | 7/2003 | Yokota et al. | .......... | 386/94 |
| 2003/0164859 A1 * | 9/2003 | Evans | .......... | 345/792 |
| 2003/0219225 A1 * | 11/2003 | Horii et al. | .......... | 386/69 |
| 2004/0133848 A1 * | 7/2004 | Hunt et al. | .......... | 715/500 |
| 2005/0015379 A1 * | 1/2005 | Aureglia et al. | .......... | 707/100 |
| 2005/0050470 A1 * | 3/2005 | Hudson et al. | .......... | 715/711 |
| 2005/0094205 A1 * | 5/2005 | Lo et al. | .......... | 358/1.18 |
| 2005/0154636 A1 * | 7/2005 | Hildinger et al. | .......... | 705/14 |
| 2005/0257158 A1 * | 11/2005 | Lombardo | .......... | 715/751 |
| 2005/0262431 A1 * | 11/2005 | Sauermann | .......... | 715/508 |
| 2006/0242557 A1 * | 10/2006 | Nortis III | .......... | 715/509 |

* cited by examiner

*Primary Examiner* — Giovanna Colan
(74) *Attorney, Agent, or Firm* — Buckley, Maschoff & Talwalkar LLC

(57) ABSTRACT

Embodiments of the invention improve upon existing auto formatting functions for tables presented in a graphical user interface by providing an improved mechanism for changing table columns in real-time. One embodiment of the invention incorporates a callback or module in a program implementing the mechanism for changing table columns in real-time that intercepts a table column resize event and automatically resizes the other columns in the table. In resizing the table columns the module can employ various approaches. The system may utilize the various resizing approaches to arrive at a desired result.

20 Claims, 11 Drawing Sheets

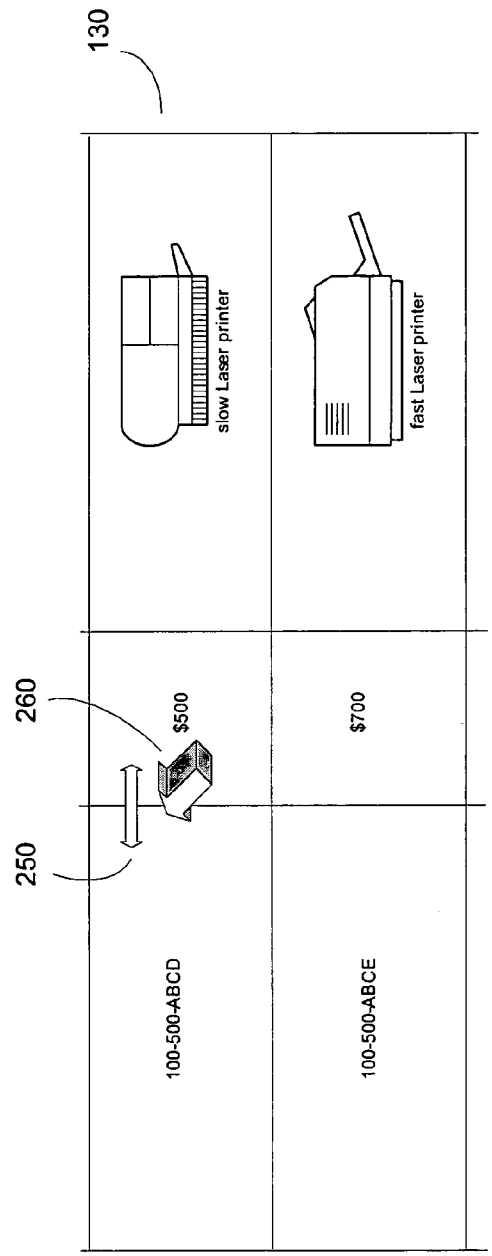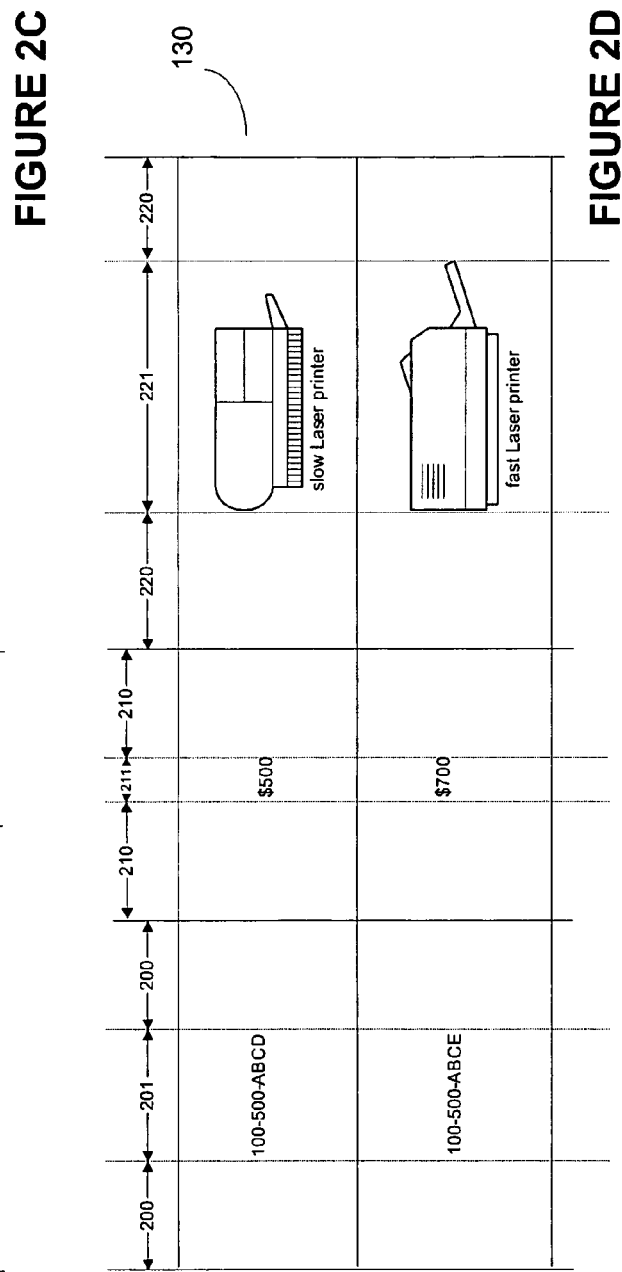

METHOD FOR REALLOCATING TABLE FORMATS IN REAL-TIME

BACKGROUND OF THE INVENTION

1. Field of the Invention

Embodiments of the invention described herein pertain to the field of graphical user interfaces. More particularly, but not by way of limitation, one or more embodiments of the invention enable systems to intelligently format table components within a graphical user in real-time.

2. Description of the Related Art

The problem with altering column sizes in presentation layer tables (for example in a graphical page layout program for a catalog) is that when a user readjusts a column width or inserts a new column, the already existing columns do not proportionally readjust while maintaining the general table structure and overall total table width. Because the column widths do not change in proportion, users are required in various instances to engage in the laborious process of altering each column by hand in order to achieve the proper proportions, each time they want to adjust the width of a single column. Without manual readjustment the columns often run off the page and/or the text within the columns is arranged in a way that is visually displeasing. Existing "auto format" functions are inadequate in that they fail to properly reallocate the format of the table in a visual pleasing way. Hence there is a need for software configured to properly reallocate table formats in real time.

BRIEF SUMMARY OF THE INVENTION

Embodiments of the invention improve upon existing auto formatting functions for tables presented in a graphical user interface by providing an improved mechanism for changing table columns in real-time. One embodiment of the invention incorporates a callback or module in a program implementing the mechanism for changing table columns in real-time that intercepts a table column event for example a resize event or text event and automatically resizes the other columns in the table in addition to the column being altered.

In resizing the table columns the module can employ various approaches employing a design pattern such as a strategy pattern than may be switched during operation. For instance, during a resize event the module may calculate the amount of space around each word or object in each column and readjust the amount of space around the text or object in order to keep the columns a size that has substantially equivalent white space around each of the respective column entries. Alternatively, or during the alteration of a column a user may switch the operation that keeps the ratio of the sizes of the columns the same regardless of the white space in each column and the operation may be switched while the altering a column so that alternative strategies for column widths may be viewed rapidly until the desired look is achieved. Table column adjustments may change the overall table width or be set to keep the overall table width constant. In addition, columns may be designated as frozen in which case they are not altered while the other columns are altered. Columns may alternatively be set to unfrozen to allow the columns to resize along with other columns using the methods of one or more embodiments of the invention.

Another strategy the module may employ is to adjust the columns to comprise an approximately equivalent width ratio as the table is made wider or narrower. A combination of white space and overall column ratios may also be utilized as when a function is utilized to combine these approaches, for example the average between the white space operation and the ratio operation. The system may utilize these and other resizing approaches to arrive at a desired result.

Another strategy the module may employ is to adjust all columns of all tables comprising a given element. Embodiments of the invention may be configured to automatically adjust all columns in all tables in a document comprising the element when for example a database field is updated or when the user changes an element in a column that exists in a plurality of tables. Changing an element may comprise typing into, deleting text from, pasting an object into, or deleting an object from a column. Altering a column may comprise changing an element or altering the column width itself, for example by dragging the column divider with a mouse to increase or decrease the size of the column itself.

BRIEF DESCRIPTION OF THE DRAWINGS

FIGS. 2C and 2D illustrate table widths and white space adjustments according to some embodiments.

DETAILED DESCRIPTION OF THE INVENTION

Figure 1:
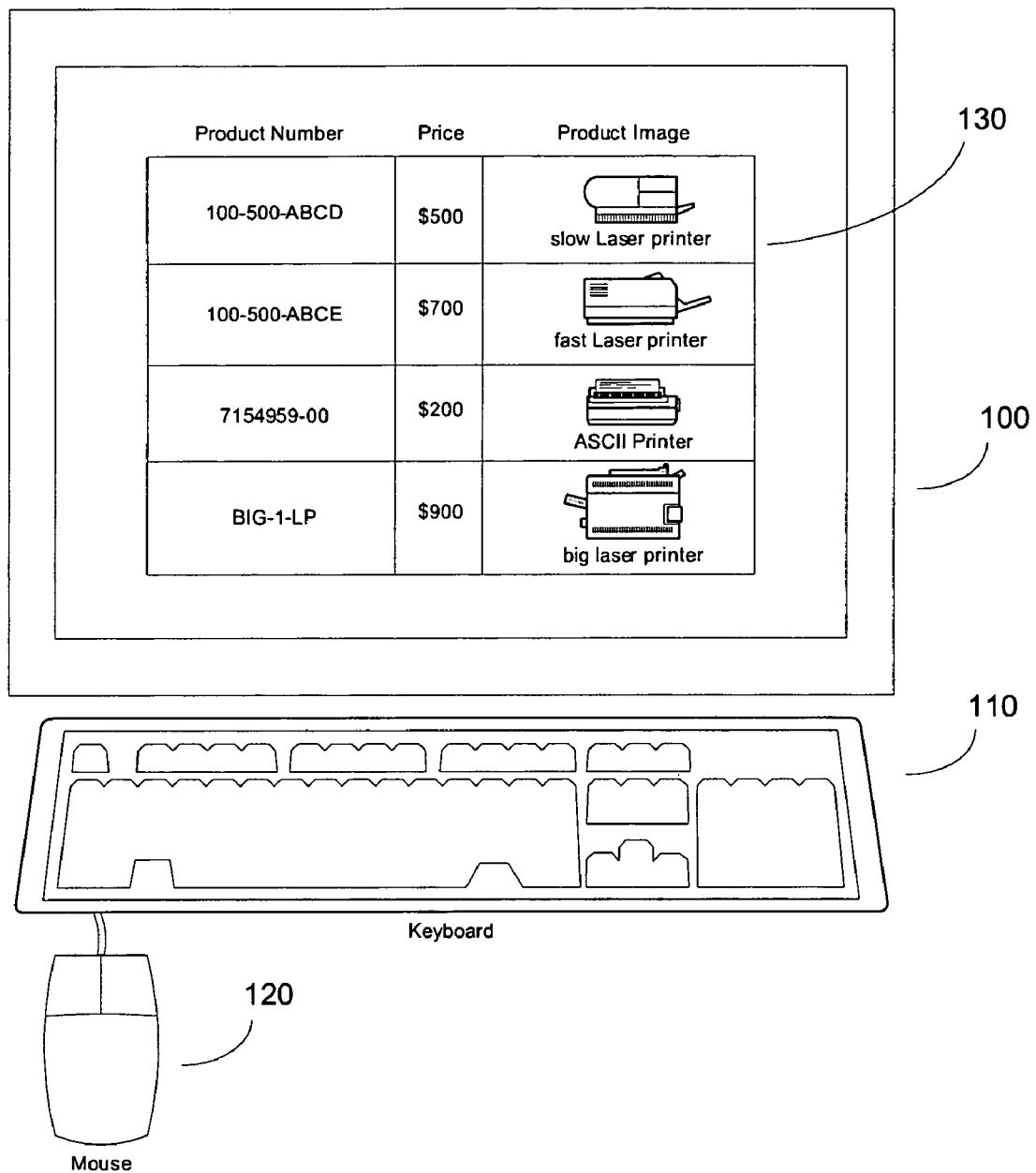
FIG. 1 shows a computer display coupled with a keyboard and mouse and shows a graphical user interface table displaying multiple columns and rows.

Embodiments of the invention improve upon existing auto formatting functions for tables presented in a graphical user interface by providing an improved mechanism for changing table columns in real-time. One embodiment of the invention incorporates a callback or module in a program implementing the mechanism for changing table columns in real-time that intercepts a table column event for example a resize event or text event and automatically resizes the other columns in the table in addition to the column being altered.

In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. Any mathematical references made herein are approximations that can in some instances be varied to any degree that enables the invention to accomplish the function for which it is designed. In other instances, specific features, quantities, or measurements well-known to those of ordinary skill in the art have not been described in detail so as not to obscure the invention. Readers should note that although examples of the invention are set forth herein, the claims, and the full scope of any equivalents, are what define the metes and bounds of the invention.

In resizing the table columns the module can employ various approaches employing a design pattern such as a strategy pattern than may be switched during operation. For instance, during a resize event the module may calculate the amount of space around each word or object in each column and readjust the amount of space around the text or object in order to keep the columns a size that has substantially equivalent white space around each of the respective column entries. Alternatively, or during the alteration of a column a user may switch the operation that keeps the ratio of the sizes of the columns the same regardless of the white space in each column and the operation may be switched while the altering a column so that alternative strategies for column widths may be viewed rapidly until the desired look is achieved. Table column adjustments may change the overall table width or be set to keep the overall table width constant. In addition, columns may be designated as frozen in which case they are not altered while the other columns are altered. Columns may alternatively be set to unfrozen to allow the columns to resize along with other columns using the methods of one or more embodiments of the invention.

Another strategy the module may employ is to adjust the columns to comprise an approximately equivalent width ratio as the table is made wider or narrower. A combination of white space and overall column ratios may also be utilized as when a function is utilized to combine these approaches, for example the average between the white space operation and the ratio operation. The system may utilize these and other resizing approaches to arrive at a desired result.

Another strategy the module may employ is to adjust all columns of all tables comprising a given element. Embodiments of the invention may be configured to automatically adjust all columns in all tables in a document comprising the element when for example a database field is updated or when the user changes an element in a column that exists in a plurality of tables. Changing an element may comprise typing into, deleting text from, pasting an object into, or deleting an object from a column. Altering a column may comprise changing an element or altering the column width itself, for example by dragging the column divider with a mouse to increase or decrease the size of the column itself.

FIG. 1 shows computer display 100 coupled with keyboard 110 and mouse 120 and shows a graphical user interface table 130 displaying multiple columns and rows. Table 130 comprises three columns with product number, price and product image headings. The contents of table 130 are exemplary and one skilled in the art will recognize that the contents of the columns may vary or comprise different arrangements and contents and may comprise more or less columns or rows. Computer display 100 may comprise an internal central processing unit or may be coupled optionally to an external computer packaged in a variety of formats.

Figure 2A:
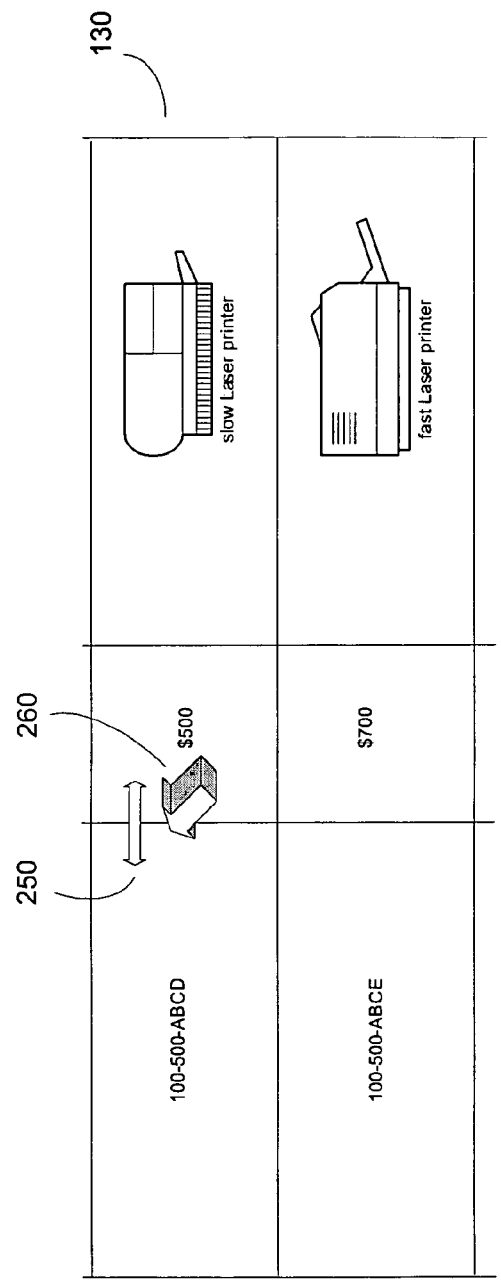
FIG. 2A shows a table with a column in the process of being resized by dragging a mouse to the left or right.
Figure 2B:
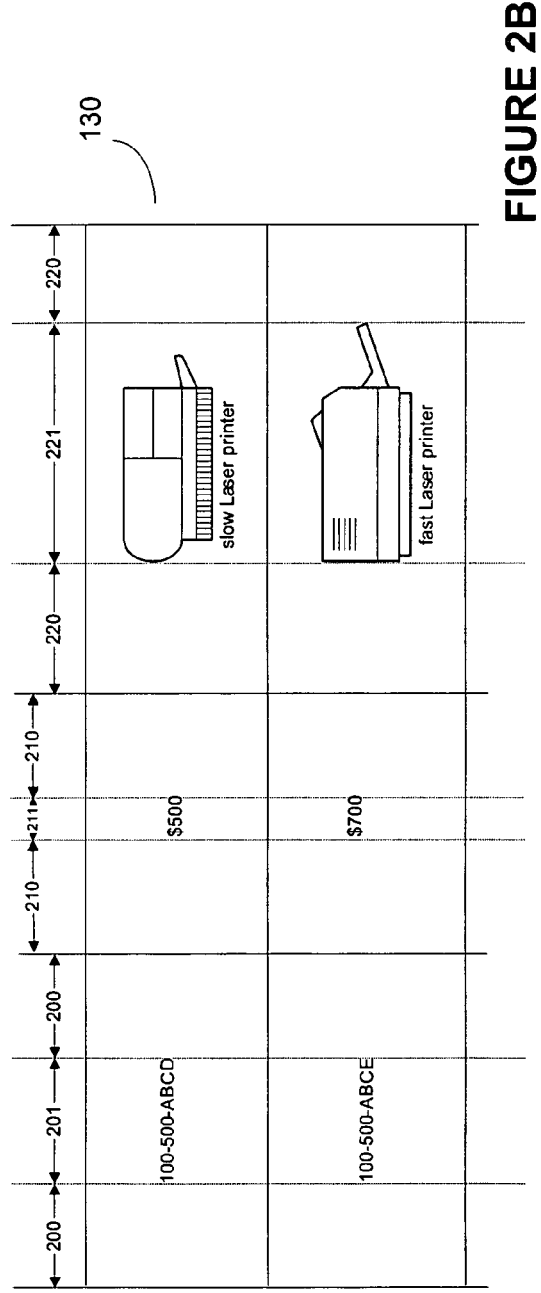
FIG. 2B shows the resulting table columns sized based on the white space surrounding the elements in the columns.

FIG. 2A shows a subset of table 130 with a column in the process of being resized by dragging mouse 260 to the left or right as shown by arrow 250. FIG. 2B shows the resulting table columns sized based on the white space surrounding the elements in the columns. Utilizing an equal white space strategy dimensions 200, 210 and 220 can be kept equal to one another while the first column in this example is being resized. Alternatively, white space dimension 200 may differ from the white space dimension 210 and 220 if a strategy of utilizing white space in proportion to each column width is utilized or if the white space on each side of each column is designated as constant. In the later cases, white space dimension 200 may be larger than white space dimension 210 and smaller than white space dimension 220 but is not shown for brevity. In all of these cases leftmost dimension 200 is equal to rightmost dimension 200, leftmost dimension 210 is equal to rightmost dimension 210 and leftmost dimension 220 is equal to rightmost dimension 220. Note that the printer in the first row comprises a picture that is narrower than the printer in the second row and that the printer in the first row is left-justified. This not required and the printer in the first row may be center-justified or right-justified or zoomed in on so that it fills the space of dimension 221. As shown, overall table width of FIG. 2B is shown as altered with respect to the table width of FIG. 2A, however the width of the table may remain a constant depending on the mode of the alteration as set by the strategy pattern in use for the table. Keeping the overall table width the same while spreading equal white space among the columns is shown as subset of table 130 in FIG. 2C is adjusted using this strategy with the resulting columns sized with equal white space in FIG. 2D. In addition, by setting a given column to "frozen", that column is not altered in width while the other columns are adjusting. For example, if the middle column of FIG. 2A is set to frozen then dimension 210 of the middle column of FIG. 2B is not altered while mouse 260 moves left or right as shown by arrow 250. Dimensions 200 and 220 then are utilized in the readjustment method and in an equal white space strategy are kept equal to one another while adjusting wherein dimension 210 remains constant. Keeping the overall table width the same while spreading equal white space over the unfrozen columns results in two dimensions therefore not locked in this strategy which are dimension 201 and dimension 221. Dimensions 201 and 221 may therefore zoom in or zoom out with respect to the corresponding contents of the associated columns. For the case of a ratio based strategy, for example if the rightmost column in FIG. 2A is 60% larger than the leftmost column in FIG. 2A, then as mouse 260 is dragged left or right, the white space of dimension 220 may grow by 60% more than dimension 200 in the variable size table strategy and in the fixed size table strategy, would change by the same amount although the entities in the columns would zoom to account for the changes required to dimensions 201 and 221 to keep the overall table width the same. A column may be set to frozen or unfrozen through any available user gesture including right clicking on a column and asserted a check box for example.

Note that although for brevity keeping the table widths the same or adjusting a column without maintaining constant table width is assumed in the following figures and as one skilled in the art will recognize is a mode of operation in keeping with the spirit of the present invention. These table width modes are referred to as VARIABLE or CONSTANT table width modes. In addition, freezing columns and unfreezing columns to allow the column to remain unaltered or to be altered respectively is assumed as another mode of operation in keeping with the spirit of the invention in all strategies listed herein and allows columns to ignore or take part in the column alteration operation at hand. Furthermore, adjusting a column may comprise a scope related to the current table or to the entire document. For example, adjusting a column comprising a given piece of data may allow the user to adjust all tables comprising the data at once if the scope of the change is set to document scope, otherwise the alteration is applied at the scope of the table being altered.

Figure 3A:
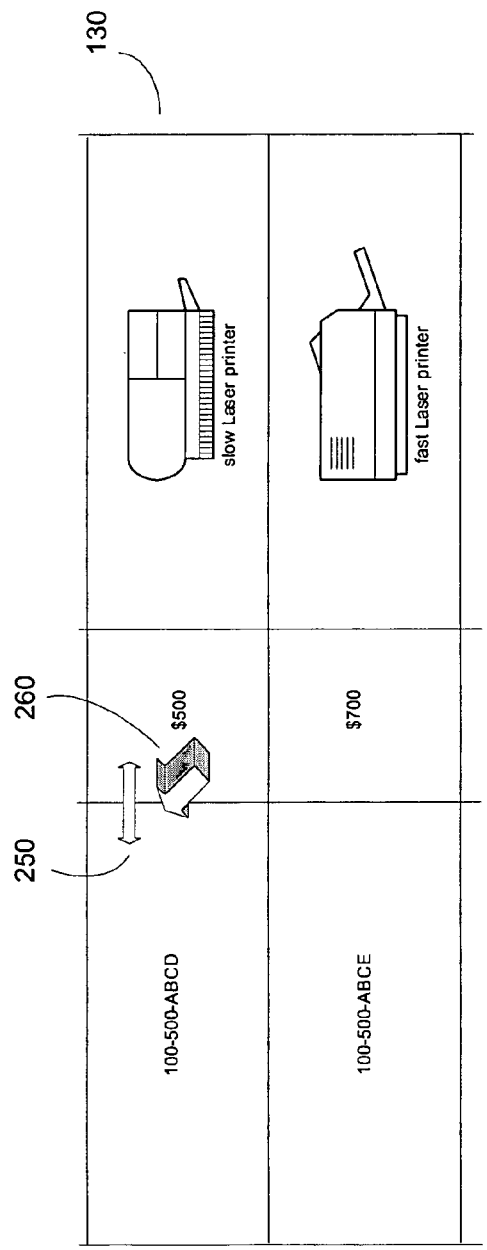
FIG. 3A shows a table with a column in the process of being resized by dragging a mouse to the left or right.
Figure 3B:
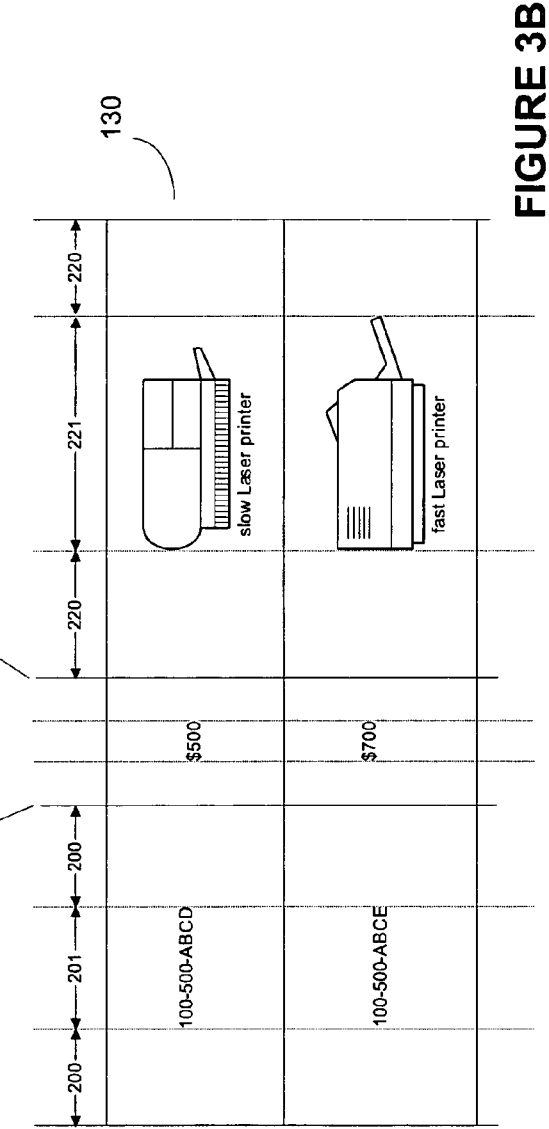
FIG. 3B shows the resulting table columns sized based on the sizes of the elements themselves residing in the columns.

FIG. 3A shows a subset of table 130 with a column in the process of being resized by dragging mouse 260 to the left or right as shown by arrow 250. FIG. 3B shows the resulting table columns sized based on the sizes of the elements themselves residing in the columns. Utilizing an item based strategy dimensions 200, 210 and 220 can be kept equal to a fraction of the size of the element in each column. In this example, dimension 200 is set to 66% of dimension 201, dimension 210 is set to 100% of dimension 211 and dimension 220 is set to 50% of dimension 221 while the first column in this example is being resized. Alternatively, white space dimensions, 200, 210 and 220 may be set to the same percentage, for example 50% of the respective element dimensions 201, 211, and 221. The overall table width using this strategy may be held constant by increasing the size of the column elements. The table width mode may be set to CONSTANT or VARIABLE in order to allow the strategy pattern in use to maintain the overall table width or allow modification of a column to alter the overall table width. This is true for all strategy patterns.

Figure 4A:
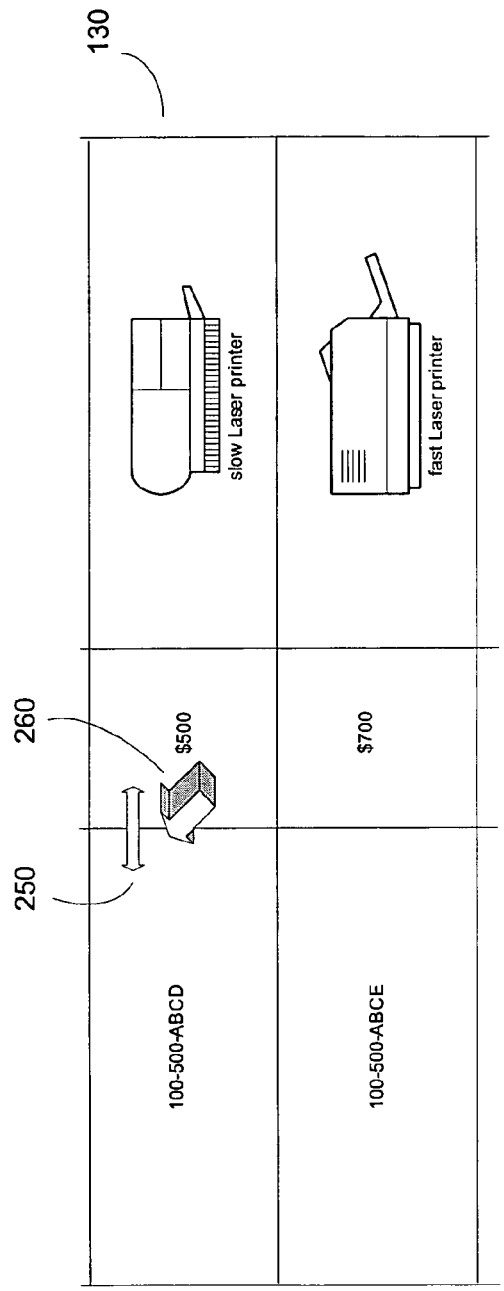
FIG. 4A shows a table with a column in the process of being resized by dragging a mouse to the left or right.
Figure 4B:
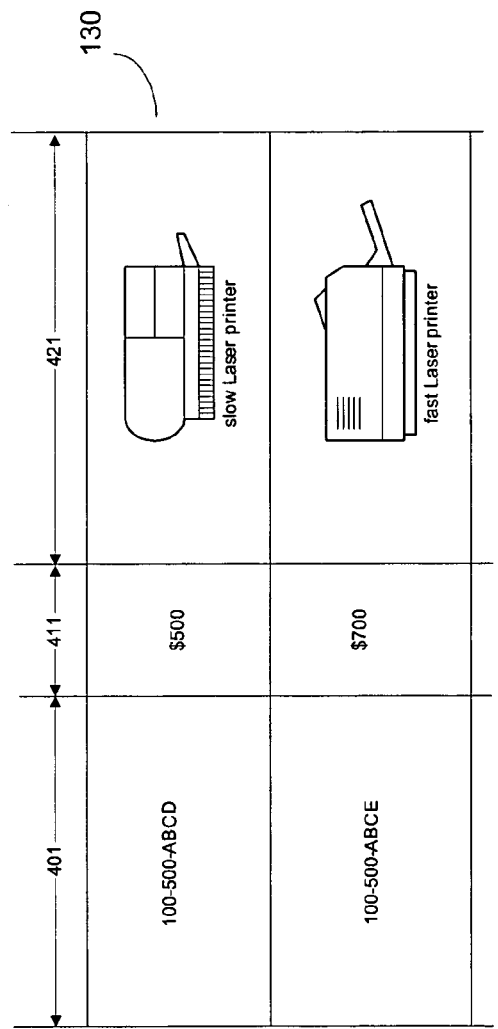
FIG. 4B shows the resulting table columns sized to comprise the ratios of the columns in FIG. 4A.

FIG. 4A shows a subset of table 130 with a column in the process of being resized by dragging mouse 260 to the left or right as shown by arrow 250. FIG. 4B shows the resulting table columns sized to comprise the ratios of the columns in FIG. 4A. Utilizing a ratio based strategy dimensions 401, 411 and 421 can be kept equal to the ratio of the columns of the table as seen in FIG. 4A. For example if the columns in subset of table 130 in FIG. 4A measure 410, 160 and 460 pixels, then the column dimensions 401, 411 and 421 would be 308, 120 and 345 pixels respectively for a VARIABLE table width strategy mode adjustment. Using a CONSTANT table width mode, the strategy pattern will not simply decrease one table column and increase another table column for a table comprising a triality of columns but will rather spread the increase in one column size to the remaining plurality of columns. For example if column width 411 increases by 100 pixels with a user dragging mouse 260 to the left direction of arrow 250, then instead of simply leaving the rightmost column the same size and decreasing the size of the leftmost column by 100 pixels, the leftmost column can be decreased by 50 pixels and the rightmost column can be decreased by 50 pixels which would be termed an equal ratio strategy. Using a CONSTANT ratio strategy would involve decreasing column width 401 by 40 pixels and decreasing column width 421 by 60 pixels if column width 401 is for example 400 pixels and column width is 600 pixels before the adjustment. This would yield a constant 10% decrease in the leftmost and rightmost columns.

Figure 5A:
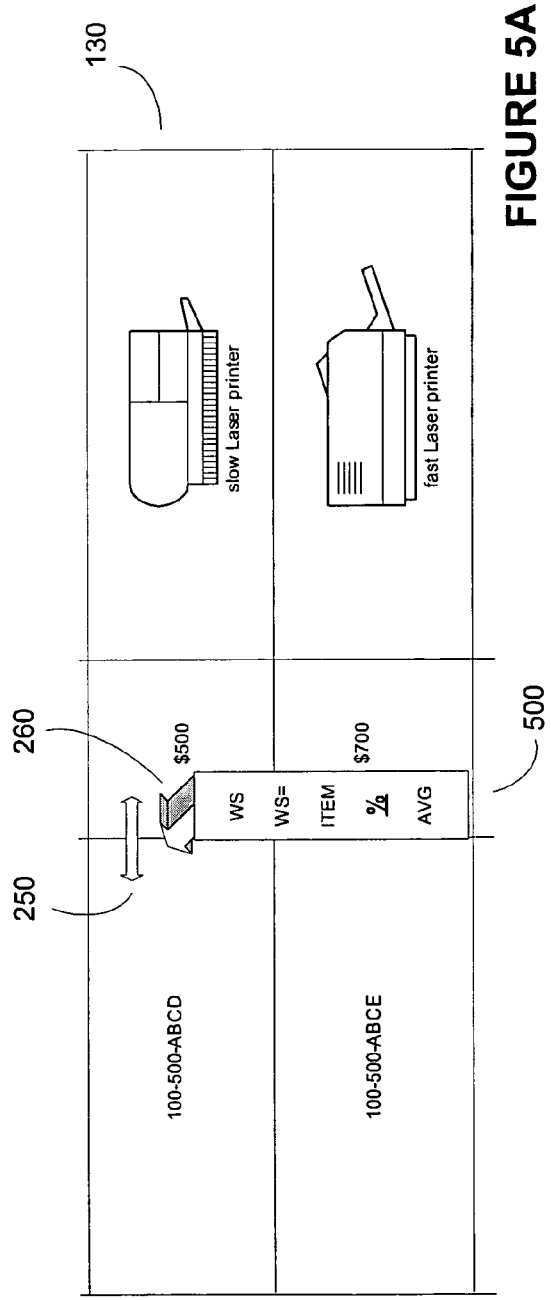
FIG. 5A shows a table with a column in the process of being resized by dragging a mouse to the left or right and dragging the mouse up or down or using a scroll wheel on the mouse.
Figure 5B:
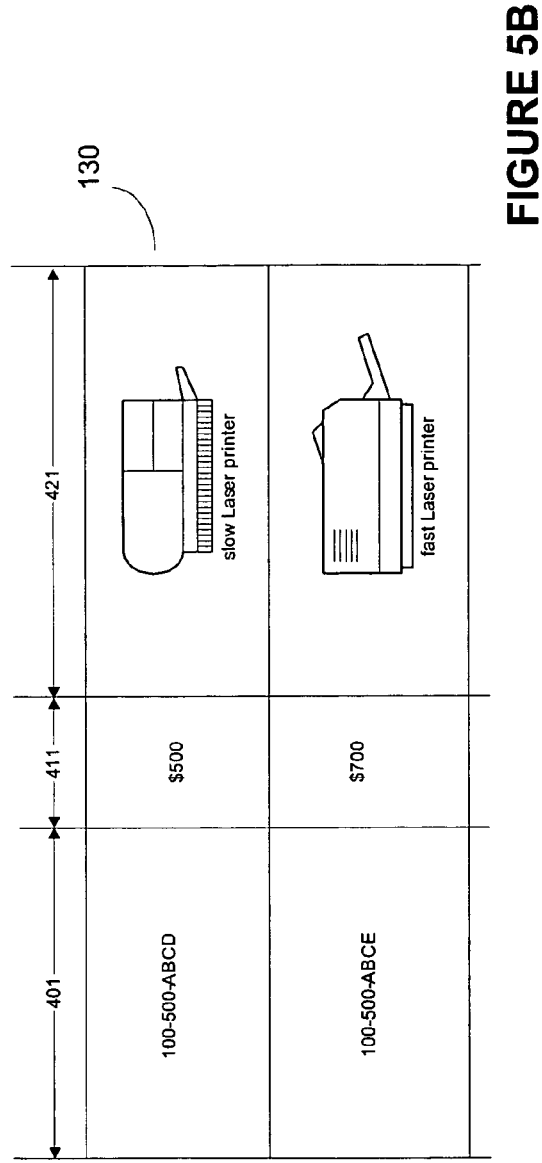
FIG. 5B shows the resulting table columns sized to comprise the ratios of the columns in FIG. 5A as shown by the selected "%" strategy selected in the popup in FIG. 5A.

FIG. 5A shows a subset of table 130 with a column in the process of being resized by dragging mouse 260 to the left or right as shown by arrow 250 and dragging the mouse up or down or using a scroll wheel on the mouse to select a strategy in strategy popup 500. FIG. 5B shows the resulting table columns sized to comprise the ratios of the columns in FIG. 5A as shown by the selected "%" strategy selected in the popup in FIG. 5A. In this case the "%" or ratio strategy is selected resulting in a table resized with column dimension ratios set to remain the same without regard for resulting white space. Holding down the shift key for example during the move may be used to switch between VARIABLE and CONSTANT table width mode. Any other mechanism for setting the mode between VARIABLE and CONSTANT table width mode including setting a menu item or check box in a popup are in keeping with the spirit of the invention.

Figure 6A:
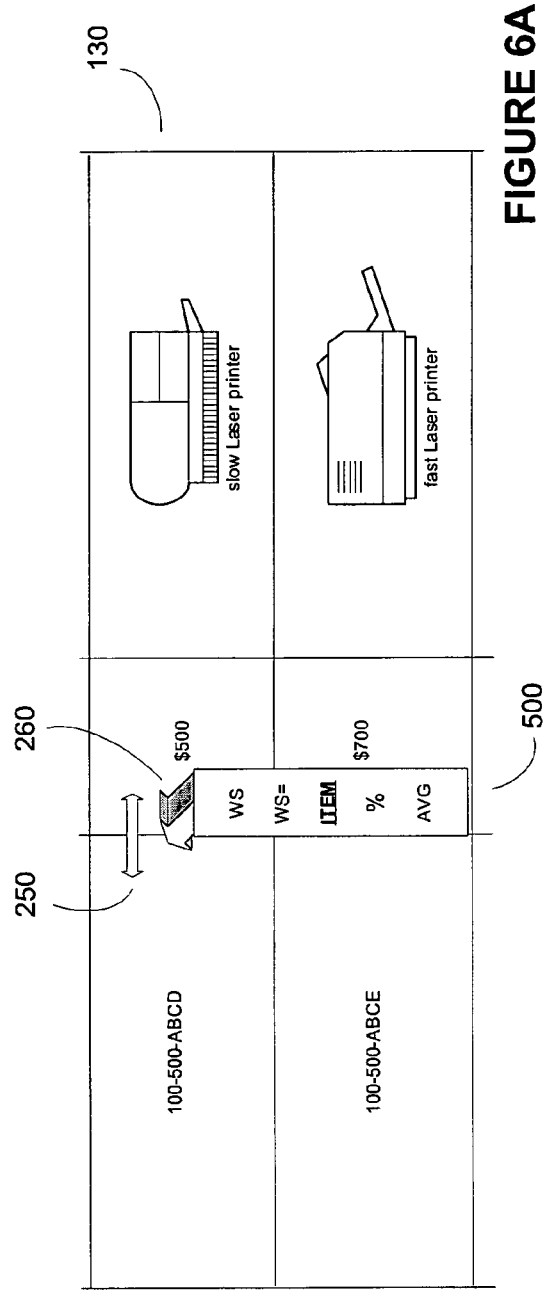
FIG. 6A shows a table with a column in the process of being resized by dragging a mouse to the left or right and dragging the mouse up or down or using a scroll wheel on the mouse.
Figure 6B:
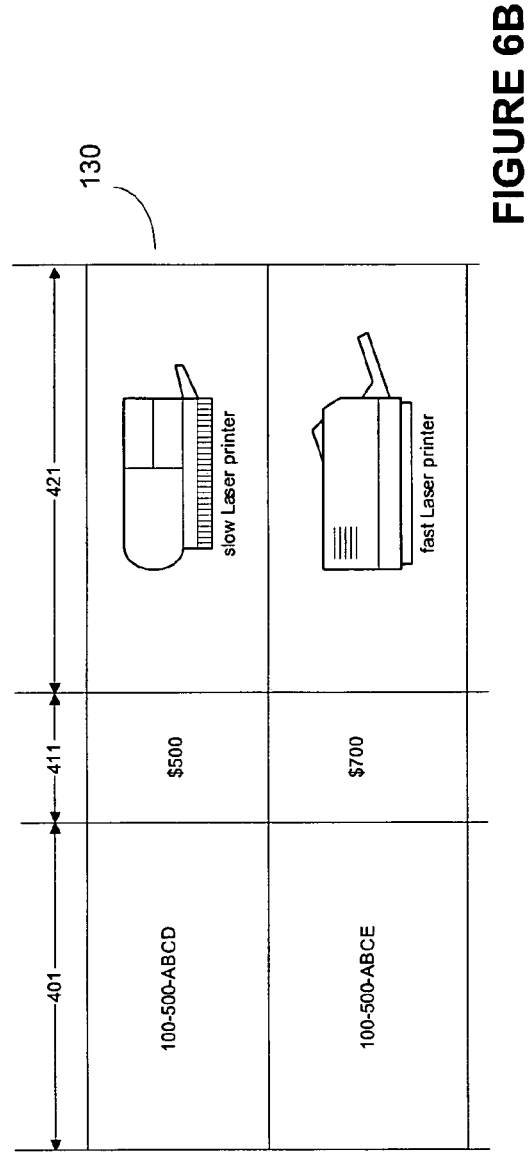
FIG. 6B shows the resulting table columns sized based on each item in the table shown in FIG. 6A as shown by the selected "ITEM" strategy selected in the popup in FIG. 6A.

FIG. 6A shows a subset of table 130 with a column in the process of being resized by dragging mouse 260 to the left or right as shown by arrow 250 and dragging the mouse up or down or using a scroll wheel on the mouse to select a strategy in strategy popup 500. FIG. 6B shows the resulting table columns sized based on each item in the table shown in FIG. 6A as shown by the selected "ITEM" strategy selected in the popup in FIG. 6A. In this case the "ITEM" or item strategy is selected resulting in a table resized with column dimensions resized as described with regards to FIGS. 3A and 3B. Although shown as a VARIABLE mode adjustment, a CONSTANT table width mode adjustment is also possible by as per the CONSTANT mode discussion with relation to FIGS. 3A and 3B.

Figure 7A:
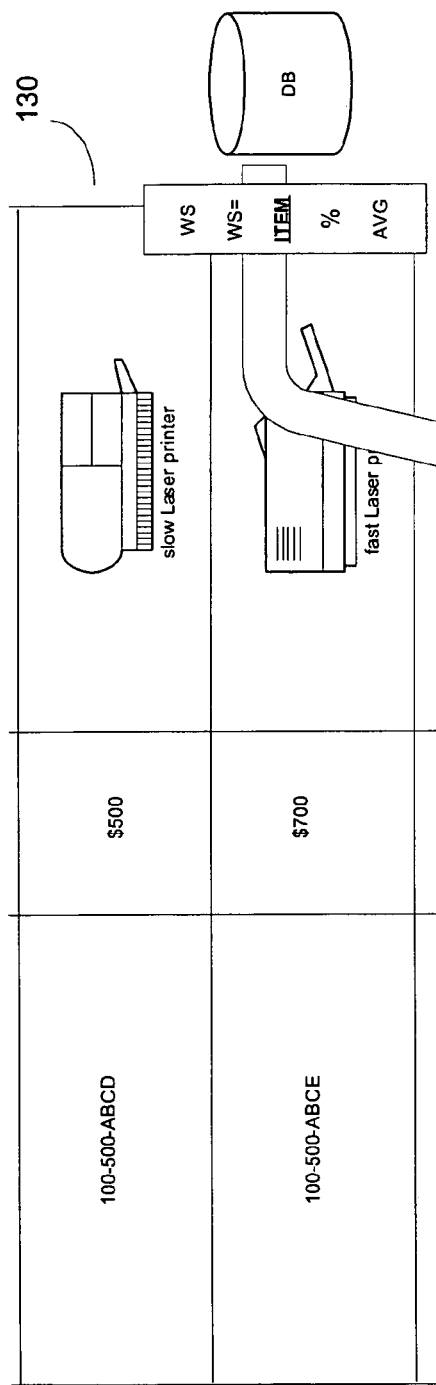
FIG. 7A shows a table with a column in the process of being updated via a database update to a field and via dragging the mouse up or down or using a scroll wheel on the mouse to select the strategy employed in updating the column sizes.
Figure 7B:
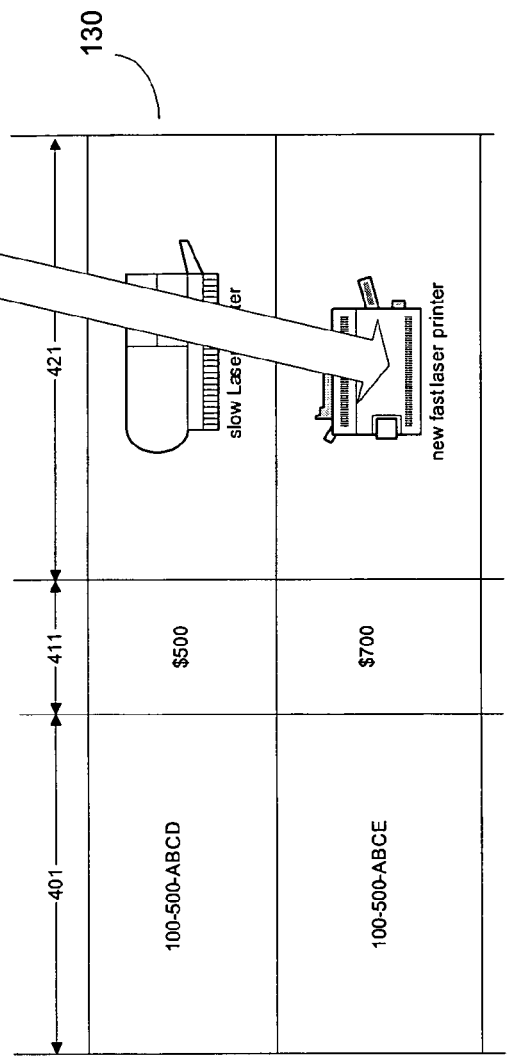
FIG. 7B shows the resulting table columns sized based on each item in the table shown in FIG. 7A as shown by the selected "ITEM" strategy selected in the popup in FIG. 7A.

FIG. 7A shows a subset of table 130 with a column in the process of being updated via a database update to a field and via dragging the mouse up or down or using a scroll wheel on the mouse to select the strategy employed in updating the column sizes. FIG. 7B shows the resulting table columns sized based on each item in the table shown in FIG. 7A as shown by the selected "ITEM" strategy selected in the popup in FIG. 7A. In this case the "ITEM" or item strategy is selected resulting in a table resized with column dimensions resized as described with regards to FIGS. 3A and 3B. For the case where families of data are used in a hierarchical manner the strategy selected may be obtained from a parent table if the strategy has not been selected for the child table. U.S. patent application Ser. No. 09/960,902 is hereby incorporated herein by reference. A parent family may comprise Laser Printers while the child families may comprise Acme Laser Printers and Best Laser Printers for example. In this case, if the graphical user interface table comprising Acme Laser Printers for example has no associated strategy then the Laser Printer family may be accessed in order to determine if a strategy for reallocating table formats has been selected for the parent family. There is no requirement that a family table has to be displayed in a graphical format in a catalog for example. The family may be used merely to set up the types of formatting associated with graphical representations of the families during presentation. CONSTANT and VARIABLE mode adjustments may be set on a per table or per document basis via any method such as a popup or menu item setting or control key for example.

Figure 8A:
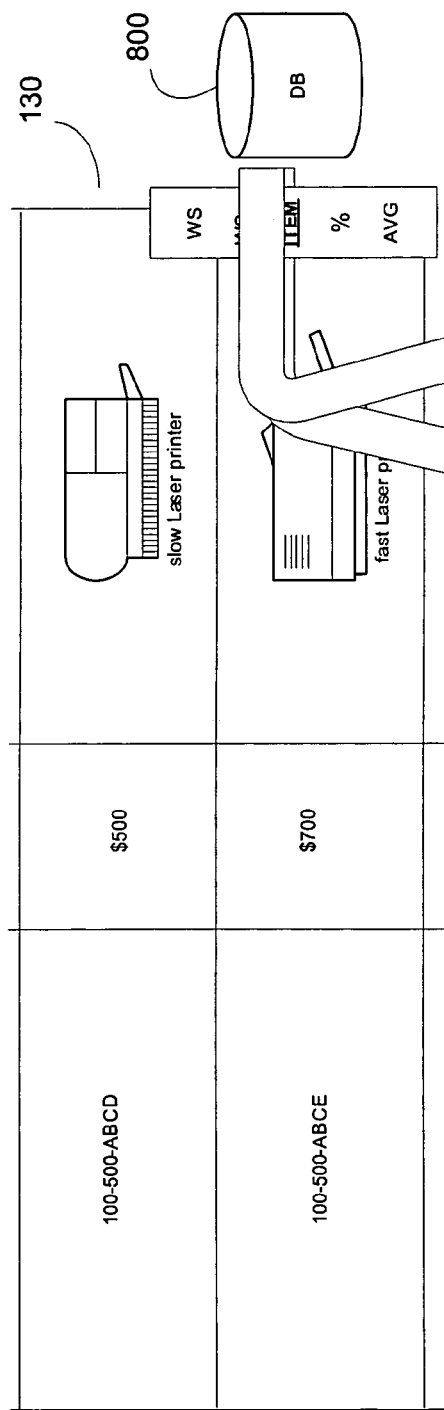
FIG. 8A shows a table with a column in the process of being updated via a database update to a field and via dragging the mouse up or down or using a scroll wheel on the mouse to select the strategy employed in updating the column sizes.
Figure 8B:
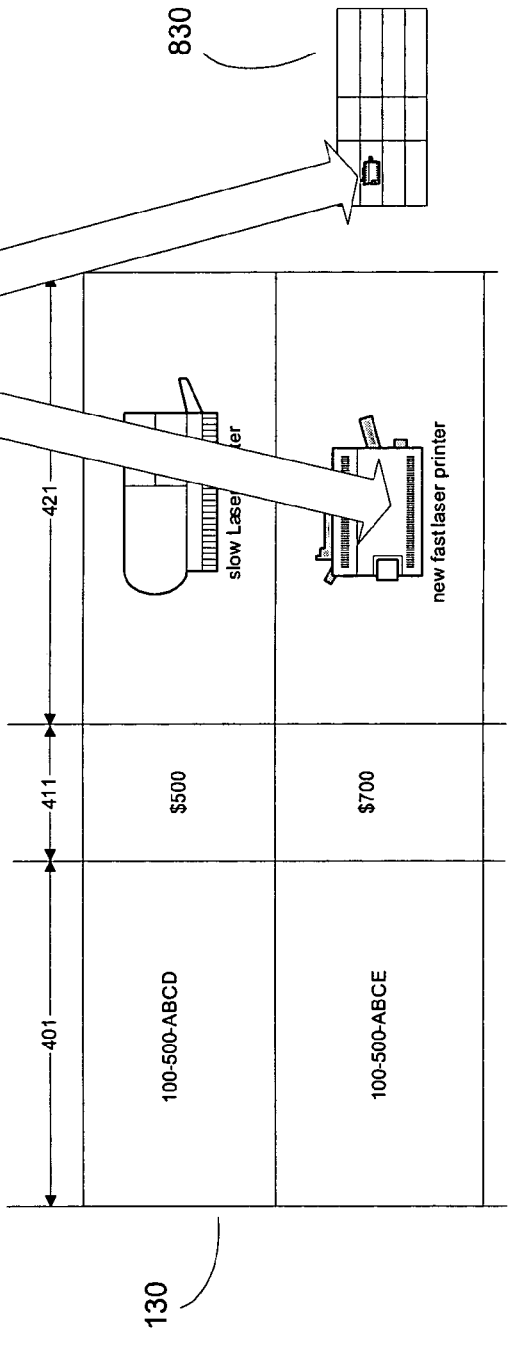
FIG. 8B shows the resulting table columns sized based on each item in the table shown in FIG. 8A as shown by the selected "ITEM" strategy selected in the popup in FIG. 8A and also shows a second table being automatically updated when it comprises the same database field.

FIG. 8A shows a subset of table 130 with a column in the process of being updated via a database update to a field and via dragging the mouse up or down or using a scroll wheel on the mouse to select the strategy employed in updating the column sizes. FIG. 8B shows the resulting table columns sized based on each item in the table shown in FIG. 8A as shown by the selected "ITEM" strategy selected in the popup in FIG. 8A and also shows a second table being automatically updated when it comprises the same database field. This example shows that table 830 also comprises the database field as displayed in the printer column of the second row of the left table shown in FIG. 8B. In this example, table 830 is resized when subset of table 130 is resized after the user is prompted for a global update to all tables in the document comprising the database field. Again, as in the case of FIG. 7A and 7B, a family table may be accessed in the database in order to determine the strategy in use for presentation of the graphical table(s) in the document. Since the graphical tables in this example may or may not belong to the same family the strategy selected for each table may or may not derive from the same family in the database. For example if one graphical table such as table 830 comprises Acme Laser printers and the subset of table 130 on the left of FIG. 8B may comprise Laser printers, there may be different strategies for each graphical user interface table in terms of presentation. However, if the graphical table displayed to the user comprises no strategy and the parent table does comprise a strategy then the parent table strategy may be obtained from the family table and utilized in the child table. If the two tables in FIG. 8B are siblings, then they may each comprise their own strategy as per the family table in the database or they one or both may utilize the parent family strategy for presentation depending on whether each particular sibling family has had a strategy for presentation set.

Figure 9A:
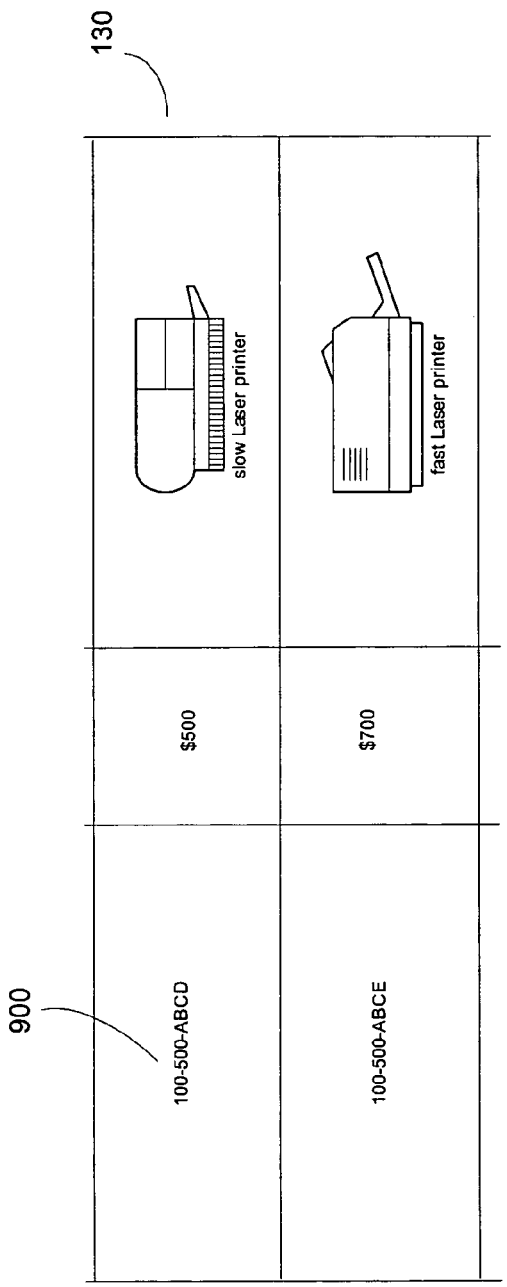
FIG. 9A shows a table with a column to be resized by globally replacing text in at least one cell of the table.
Figure 9B:
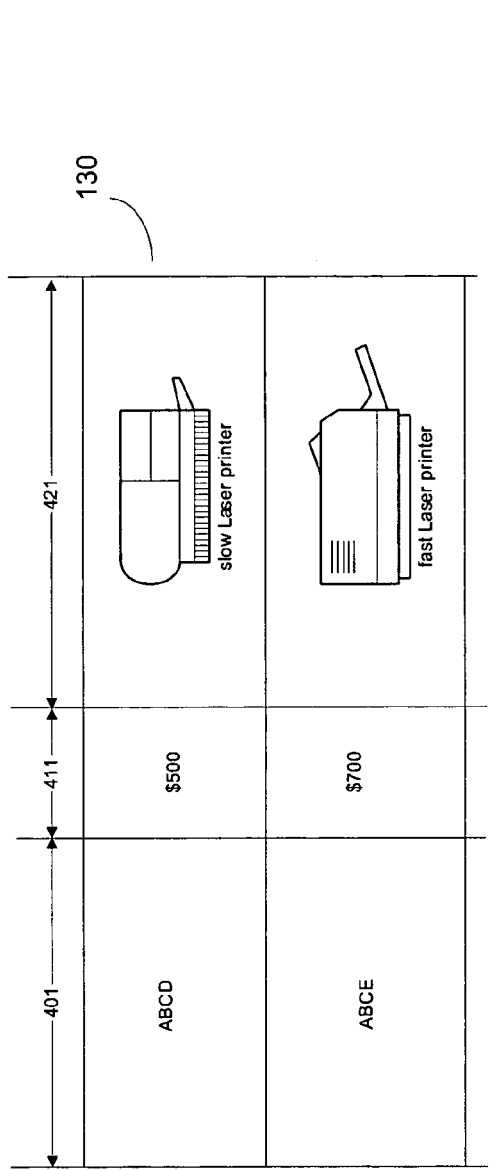
FIG. 9B shows the resulting table columns sized to comprise the ratios of the columns in FIG. 9A.

FIG. 9A shows a subset of table 130 with a column to be resized by globally replacing text in at least one cell of the table. In this example all text "100-500-" is replaced with no text globally throughout the document or for example within the database. FIG. 9B shows the resulting table columns sized to comprise the ratios of the columns in FIG. 9A when for example the strategy employed or last set is "%" or ratio strategy. CONSTANT and VARIABLE table width mode settings per table or per document may be altered in order to control whether each table or all tables adjust in overall width or on a column basis.

Figure 10:
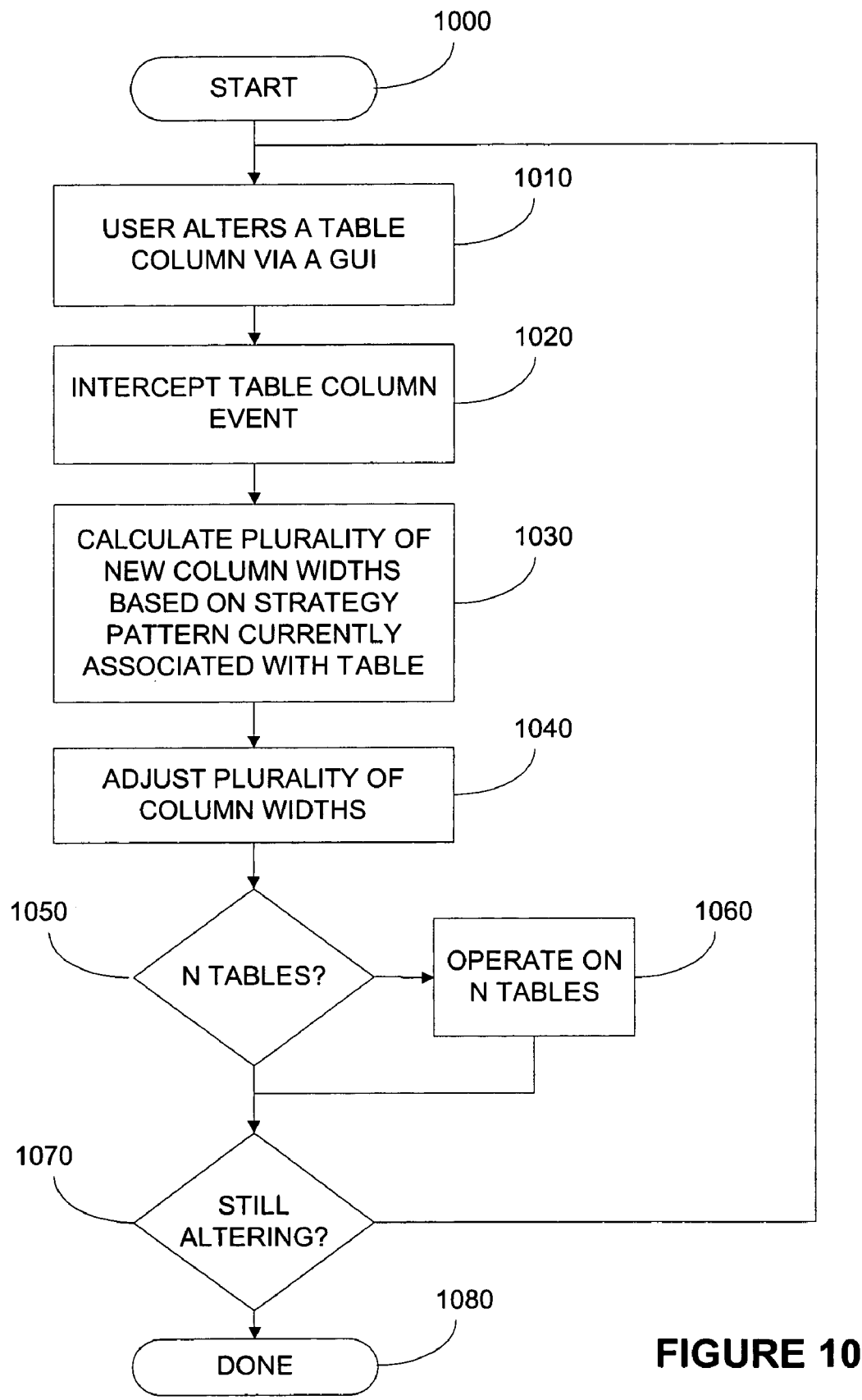
FIG. 10 shows a flow chart of the process of reallocating table formats in real-time.

FIG. 10 shows a flow chart of the process of reallocating table formats in real-time. The process starts at 1000 with the user altering a table column via a Graphical User Interface (GUI). This may involved inserting or deleting text or objects or dragging a column border to increase or decrease a column size. When the GUI delivers an event to the module utilized in embodiments of the invention to intercept a table column event at 1020, the module calculates the column widths for the remaining columns based on the strategy in use at 1030 as previous set or as queried to the user. The column widths of the columns are set to either keep the entire table width constant or to alter the sizes of the columns without regard for total table width using the strategy patterns described herein. If the global adjust for "N tables" at 1050 is set or as queried to the user, i.e., the scope of the adjustment is document scope, then the adjustment proceeds for "N tables" at 1060. If the global adjust option is not desired, then if the user is still adjusting a column (for example typing into a column or dragging a column) then the processing continues at 1010 or stops at 1080.

Thus embodiments of the invention directed to a method for reallocating table formats in real-time have been exemplified to one of ordinary skill in the art. The claims, however, and the full scope of any equivalents are what define the metes and bounds of the invention.

What is claimed is:

1. A method for auto formatting a table in real-time in a graphical page layout program in a graphical user interface (GUI) on a computer display, said method performed by a computer coupled to said GUI and said computer display, said computer programmed to perform said method in response to user input, said method comprising:
    displaying a plurality of data elements of a database in a table format on a GUI on a computer display by a graphical page layout program representing a layout of a graphical page, said graphical page layout program performed by a computer couple to said computer display;
    accepting a table column event generated in response to a user action of altering a size of a column of said table format on said GUI;
    presenting a strategy menu comprising a plurality of white space formatting strategies, wherein each of said plurality of white space formatting strategies comprises at least one formula for calculating the amount of white space around objects in each column and calculating a plurality of new column widths of said table based on column content;
    accepting a user-selected white space formatting strategy related to said plurality of data elements of said database, wherein said user-selected white space formatting strategy is selected from said plurality of white space formatting strategies; and
    intercepting said table column event and applying said user-selected white space formatting strategy to at least one column of said table format of said layout of said graphical page after and in response to said user action whereby a plurality of columns of said layout of said graphical page are automatically reformatted according to said user-selected white space formatting strategy,
    wherein said user-selected white space formatting strategy may be switched during operation.

2. The method of claim 1 wherein said white space formatting strategy comprises accessing a family strategy pattern of a parent family.

3. The method of claim 1 wherein a first column of said table format is designated as frozen in said white space formatting strategy.

4. The method of claim 1 wherein a first column selected from said table format is designated as unfrozen by said user and thereafter takes part in said automatic reformatting.

5. The method of claim 1 wherein said white space formatting strategy comprises equal white space on each side of each cell of each column of said table format.

6. The method of claim 1 wherein said white space between said data element and each side of each cell of said each column of said table format is determined by a minimum starting amount of white space around said data element as said white space formatting strategy.

7. The method of claim 1 wherein said white space formatting strategy comprises determining ratios between said each column.

8. The method of claim 1 further comprising automatically reformatting all tables in a graphical page layout comprising a particular element in at least one cell of said all tables.

9. The method of claim 1 wherein said altering comprises updating said table column from a database field.

10. The method of claim 1 wherein said altering comprises typing in said table column.

11. The method of claim 1 wherein said altering comprises deleting text from said table column.

12. The method of claim 1 wherein said altering comprises dragging said table column.

13. The method of claim 1 wherein said altering comprises pasting an object into said table column.

14. The method of claim 1 wherein said altering comprises deleting an object from said table column.

15. The method of claim 1 wherein said user-selected white space formatting strategy comprises a ratio strategy, wherein column dimension ratios are set to remain the same without regard for any resulting white space.

16. The method of claim 1 wherein said user-selected white space formatting strategy comprises an item strategy, wherein dimensions of whitespace surrounding elements contained within each column are set to change based on a fraction of an element dimension of said elements.

17. The method of claim 1 wherein said user-selected white space formatting strategy comprises an average strategy comprising calculating based on an average of two or more other white-space formatting strategies.

18. The method of claim 1 wherein said user-selected white space formatting strategy comprises adjusting all columns of all tables comprising a given element.

19. The method of claim 18, wherein said given element corresponds to a database field of said database comprising modified data.

20. The method of claim 1 further comprising setting at least one designated column as frozen, wherein said user-selected white space formatting strategy is not applied to said at least one designated column.

\* \* \* \* \*